June 16, 1953     E. S. WEST ET AL     2,642,426
METHOD OF PRODUCING THYROPROTEIN
Filed April 17, 1950
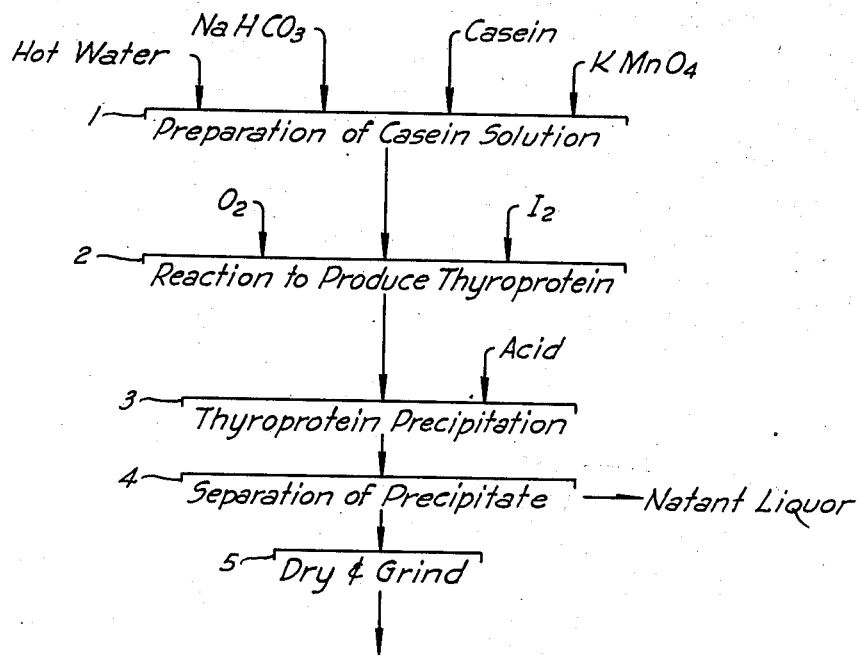
INVENTORS
Edward S. West
BY John T. Van Bruggen
ATTORNEYS Patented June 16, 1953

2,642,426

UNITED STATES PATENT OFFICE 2,642,426

METHOD OF PRODUCING THYROPROTEIN

Edward S. West and John T. Van Bruggen, Portland, Oreg., assignors to Feed Products Company, Petaluma, Calif., a corporation of California Application April 17, 1950, Serial No. 156,374

4 Claims. (Cl. 260—112)

This invention relates generally to a method for the production of iodinated thyroactive proteins and more especially to a method which includes the production of thyroxine.

It has been long known in the art that by hydrolyzing certain of the great variety of proteins it is possible to produce various amino acids, among which is the amino acid known as tyrosine. It has also been well known that it is possible to both iodinate and couple tyrosine radicals to get as a final result an amino acid having active thyroid stimulating properties. Such a compound is known as synthetic thyroxine. It is also well known that there is an intermediate product between the tyrosine and the thyroxine which is known as di-iodotyrosine, which under proper conditions will couple to form thyroxine.

At the present time the best known prior art method for producing a thyroprotein consists of a multi-step process requiring careful testing to control the reaction. The reaction consists in general of the combination of iodine with a protein and the subsequent working of such iodinated protein to produce a thyroidally active product. For instance, a protein-containing material such as skim milk or casein is placed in a container and maintained at a temperature of from 38 to 40° C. and stirred in a closed container with vigorous agitation. Finely divided iodine is added slowly in small amounts over a period of three to four hours until an end point is reached at which Millon's reaction gives a negative result and free iodine can be detected in the mixture for several minutes. After reaching the end point the solution is placed in a constant temperature bath and held at an elevated temperature of about 70° C. for a period of 18 to 24 hours. The pH of the solution is then adjusted to the isoelectric point in order to precipitate the protein. The precipitate is washed with water of a pH of 4.0, filtered, dried and ground. In this and in similar prior art processes, the formation of an artificial thyroprotein having maximum thyroidal activity is dependent upon a two stage reaction, the first stage occurring when the protein is iodinated at from 38 to 40° C. It is during this period that an intermediate product is formed which has been deemed essential to produce the thyroidally active material. It is stated that the maximum production of this intermediate product depends upon holding the iodine concentration to a definite limit. It is for this reason that it has generally been necessary to apply some test such as the Millon or Biuret test to insure that this iodine concentration is present.

To summarize the above, the prevailing prior art process for producing synthetic thyroprotein materials has involved two distinct steps and the efficiency of the process has been thought to depend upon the critical iodination in the first step. The determination of such iodination has involved complex and expensive testing methods. After a determination of this iodination the second step has involved a lengthy and careful "incubation" to convert the intermediate product to a product including the final synthetic thyroprotein.

In contrast with the above prior art, our process employs a single step in which all reactions to form the thyroprotein are completed. We have discovered if the iodination is carried out at a higher temperature and under proper reaction conditions, including the use of a proper catalyst, the intermediate step may be completely eliminated and that it is unnecessary to first carefully insure complete iodination before proceeding to produce synthetic thyroprotein.

It is an object of this invention to provide a simple process for the rapid and efficient production of thyroxine-containing materials.

It is a further object of this invention to provide a method for producing synthetic thyroprotein with a minimum of technological control during the process.

It is a further object of this invention to provide a method for the production of synthetic thyroprotein which will yield a product of relatively high potency with a minimum loss of reactant material.

Further objects of this invention will be evident from the following description of the process and a description of a commercial application of one embodiment of the invention.

Our process begins with a concentrated solution of proteinaceous material selected from any one of the many proteins containing the amino acid tyrosine, such as casein, corn gluten, silk fibroin and soy protein. A solution of such material is subjected to vigorous agitation by the use of mechanical agitators at a relatively high temperature. It is conditioned for subsequent efficient oxidation by the addition of a small amount of potassium permanganate and by passing oxygen or an oxygen-containing gas through the solution. According to our observations we believe that the action of the oxygen serves to provide maximum oxidative conditions, while the permanganate has a predominantly catalytic effect. The action of the permanganate is apparently catalytic since the amount required is minute in comparison to the theoretical amount required as an oxidizing reagent. Potassium permanganate is however a very efficient oxidizing agent and is reduced almost immediately upon addition to the casein solution, so that its direct oxidative effects are of short duration. We believe that the rapid although brief instantaneous oxidation effected by the potassium permanganate produces some highly active material and in general serves to precondition the reactants for a more efficient participation in the subsequent reaction. In addition, we believe that certain undesirable substances are rendered inert. In any event, reducing the potassium permanganate while it is completely dispersed throughout the solution results in the depositing of very fine particles of catalyst intimately among the protein molecules. Therefore, instead of dispersing the metallic catalyst throughout the reaction medium by agitation or other means we have discovered it to be more efficient to introduce the catalyst in solution and to form the active catalyst by direct reaction with the molecules of the protein. In this way freshly made oxides of manganese are formed in minute particles equally dispersed throughout the solution. These particles serve well as oxidizing catalysts when oxygen is bubbled into the solution.

A short time will ordinarily elapse after permanganate addition before the operator is ready to add iodine to the solution. In practice an interval of fifteen minutes is more than adequate to permit any preliminary oxidation to occur. Sufficient iodine is added to the agitated solution described above to iodinate the available tyrosine-protein contained therein. Two reactions take place simultaneously at this point with the production of di-iodotyrosine and thyroxine.

In forming di-iodotyrosine, hydrogen iodide or hydriodic acid is produced. We have found that the production of thyroactive protein and especially thyroxine is enhanced in an alkaline solution. Therefore we utilize the effects of a buffer salt such as for example, sodium carbonate, sodium bicarbonate, potassium carbonate, or potassium bicarbonate to maintain the pH on the alkaline side at a value of about 8 to 9 by incorporating it with the solution. As hydriodic acid is produced and dissolved in the solution the buffer salt reacts as needed to maintain the pH. The use of an alkaline buffer salt solution has the added effect of assisting in the dissolution of dry casein when that material is selected as a tyrosine source.

The iodine may be added to the solution quickly since it is only necessary to insure that it is properly dispersed by the motion of the agitated solution, in order to prevent certain of the crystals from falling lump-wise directly to the bottom of the tank should the crystals be introduced in one batch.

Agitation and oxygen sparging are continued at the high temperature for a period of from six to ten hours, to permit the reaction to reach a suitable end point. We believe that this reaction is essentially one involving oxidative coupling of the di-idotyrosine molecules to form thyroxine. We believe that other thyroactive protein materials are formed during the reaction in addition to thyroxine. In any event, thyroxine is an organic amino acid well known to be an active thyroid substance.

When the desired reaction result has been reached, oxygen sparging is discontinued and the solution is cooled, meanwhile maintaining continuous agitation. The solution is dropped to the isoelectric point by acid addition and coarse curds are formed and precipitated. The mechanical action of the agitators has the effect of breaking the coarse curds into a finer size. We have found that the precipitate will settle better and will be easier to filter if precipitated from a warm solution rather than in the cold.

The precipitated curds are separated from the solution, dried and ground. We have found that it is not necessary to wash the curds and that the thyroactive protein material formed is held and closely associated with the precipitated material.

In practice we prefer to employ casein as a starting material since it is not only a good source of tyrosine, but in addition is relatively inexpensive. Either dry or liquid casein may be used but if dry casein is used it must first be put into solution by addition to a hot dilute alkaline solution. We have found that water at a temperature of from 150 to 175° F. to which has been added sodium bicarbonate provides a good solute. With vigorous agitation casein may be nearly completely put into a sodium caseinate solution in a short time. We have found that a casein concentration equivalent to from 50 to 75 grams per liter may be satisfactorily reacted and that 60 grams per liter is the preferable concentration. We prefer a sodium bicarbonate addition equal to approximately 25% of that of the casein to insure ready solution of the casein and also for the purpose of acting as a buffer solution throughout the reaction to maintain the pH of the solution in the moderately alkaline range throughout the process.

The concentration of the casein solution referred to above is relatively high compared to prior art practice. Thus the prior art recommends concentrations of the order of from 20 to 30 grams per liter. The use of relatively higher concentrations is deemed advantageous since it effects better coupling during the reaction while reducing the loss in the by-product liquor.

Having the casein in almost complete solution either by the method described above for dry casein or by using liquid casein, the temperature of the casein solution should be between 150 and 175° F. before the process is begun. In order to insure proper dispersion of the reacting materials and incidentally to assist in the more complete solution of any lumps of dry casein which have not been dissolved, mechanical stirrers capable of producing vigorous agitation should be continuously employed.

The reaction is greatly enhanced by bubbling oxygen through the solution. While an oxygen-containing gas such as air may be used we have found it advantageous to use pure oxygen. The oxygen may be introduced in a very simple manner as for instance by a pipe running along the bottom of the tank and having a plurality of small nozzles or holes and adapted to be connected to an oxygen source. By such a simple installation and with vigorous agitation the oxygen is well sparged throughout the solution throughout the reaction. We have found it convenient to begin the oxygen sparging before the introduction of the various reacting materials.

The preparation of the casein solution is completed with the casein solution at a temperature of approximately from 150–175° F. (optimum about 170° F.) and under vigorous agitation. A concentrated water solution of potassium permanganate is added in an amount within the range of from approximately one-sixteenth (1/16) to one-quarter (1/4) pound of potassium permanganate to three hundred pounds of casein. While it is more convenient to add the potassium permanganate in concentrated solution it may well be added in crystalline form.

Immediately after the addition of potassium permanganate, crystals of iodine can be added to the solution at a rate limited only by the speed with which the agitators may disperse the iodine crystals into the solution. The amount of iodine to be added may be in an amount equivalent to the concentration of about 9 to 12 grams of iodine to 60 grams of casein. With normal agitation this iodine addition will take no longer than from 15 to 30 minutes.

Once the iodine has been added the temperature of the solution should be raised to approximately 180–190° F. and agitation and sparging continued for a period of from six to ten hours. While it is possible to continue the reaction for a considerably longer time it has been found that over-extension of the reaction has the effect of producing a thyroprotein of greater potency but has the disadvantage of greatly reducing the yield. Therefore the reaction is concluded at a time when a relatively high potency product has been reached while at the same time the yield remains high.

Once the optimum end point of the reaction has been reached, as for example, when the product contains from 3 to 4% thyroxine, the solution is cooled to a temperature of 130 to 160° F. with continued agitation, while at the same time oxygen sparging is discontinued. When the solution has been cooled it is necessary to add a concentrated acid solution to reduce the pH to the isoelectric point, approximately 3.9, to thereby precipitate the casein. Concentrated hydrochloric acid or sulfuric acid has been found to be well suited for this purpose although various mineral acids may be used to reduce the pH.

After allowing a reasonable time for settling of the protein curds formed the natant liquor is decanted and the curds are separated. The curds originally formed upon addition of the mineral acid will be somewhat coarse and by continued agitation as described above, it will be found that the action of the impellers will cause the coarse curds to break up into smaller curds. After separation of the curds they are dried and ground for packaging and sale. It is unnecessary to wash the curd-like product before preparation for use.

The accompanying flow sheet is a diagrammatic representation of the process as described above. Stage 1 indicates the preparation of the casein solution, including the dispersion and dissolution of the casein in a hot sodium bicarbonate solution. Stage 2 indicates the complete reaction step which is carried out at a temperature of from 180–190° F. with agitation and oxygen sparging. Stage 3 represents cooling the solution after the reaction step and reducing the pH to the isoelectric point for precipitating the casein. Stage 4 represents the curd separation from the natant liquor as by settling and spin drying. Stage 5 indicates the drying and grinding of the final product for packaging or storage.

One example of a commercial adaptation of the process is as follows: Using a stainless steel jacketed open tank, 600 gallons of water were introduced at a temperature of 150° F. The tank was fitted with two motor driven mechanical agitators capable of providing vigorous agitation to the liquid in the tank. With the hot water under vigorous agitation 75 pounds of sodium bicarbonate were added and quickly dissolved. Into this solution were slowly added 300 pounds of dry casein. In order to prevent excessive foaming at this point a small quantity, about 150 cc. of an antifoam emulsion was added. When the casein was nearly all in solution the temperature was raised to 168° F., one quart of a water solution containing approximately one-eighth of a pound of potassium permanganate was added. After the addition of the potassium permanganate and with continued agitation and oxygen sparging, 50 pounds of iodine crystals were slowly added at a rate sufficient to adequately disperse the iodine crystals throughout the solution, which required less than 30 minutes. Heat was then applied to the outer jacket of the tank to bring the contents of the tank to a temperature of 183° F. and the tank was permitted to remain at this temperature under constant agitation and sparging for a period of ten hours. With an open topped tank it was found that some water was lost by evaporation and the volume was kept constant throughout the reaction by adding additional water as required. This evaporation amounts to not more than 50 gallons in the course of the ten hour reaction.

After ten hours time, the oxygen was shut off and the contents of the tank drained to another tank to cool under constant agitation. It was found that in a batch of this size 550 cubic feet of oxygen were used throughout the reaction. When the temperature of the solution reached 155° F. the proteinaceous material was precipitated by the addition of hydrochloric acid. Seven and one-half gallons of concentrated hydrochloric acid were added to produce a pH of 3.9. The solution was permitted to cool to 120° F. before agitation was stopped and the solution left to settle. After settling the upper liquid was decanted and the remaining curd put into a centrifuge and spun dry. After spin drying the curds were placed on trays and put into an oven to dry. After six hours drying time the material was ground to a very fine consistency and bagged.

The foregoing example is merely illustrative of one method of carrying out the process embodied in our invention for the commercial production of synthetic thyroprotein. The process may be varied within certain limits to adapt it to varying conditions found in commercial processing.

It will be obvious from the foregoing that a process embodying our invention is considerably more simple and less difficult to control than those now known. Our invention employs only a single step process and avoids the necessarily complicated determination of free iodine and total iodination which is a characteristic of those two step processes in which the production of the intermediate compound must be determined. We are not certain as to all of the compounds which may or may not be formed during the reaction but we do know that the product produced by our reaction has a potency equivalent of from 2.9 to 3.9% pure thyroxine. In view of the fact that the theoretical yield of thyroxine from casein is around 10%, this is a very creditable yield in a field of complex and delicate organic reactions. If 50 pounds of iodine crystals are used one-half of the iodine added to the reaction is lost in the form of hydriodic acid, which is presumably formed from the hydrogen substituted from the organic ring when the proteinaceous material is iodinated. Therefore when using 300 pounds of casein and adding 50 pounds of iodine only 325 pounds of product could be expected as a theoretical 100% yield. In the commercial example given above the thyroproteinaceous material having a 3.9% potency was recovered in the amount of 275 pounds. Therefore it can be said that our process also is capable of producing a high yield.

Our invention avoids the time consuming step of first iodinating the proteinaceous material at a low temperature and at a very slow rate before attempting to proceed with the production of a synthetic thyroprotein. By accomplishing the iodination at the beginning of the reaction we believe that a more efficient iodination is accomplished and that this accounts for the better results in the product. By using potassium permanganate in addition to the oxygen sparging we believe that the potassium permanganate produces some highly active material within the reaction by the immediate oxidation of the protein upon the addition of the potassium permanganate. By simultaneous reduction of the potassium permanganate within the solution we believe that a very intimate dispersion of oxides of manganese is achieved, thereby greatly enhancing the mechanics of the reaction.

Other than running check assays on the final product it is not necessary to utilize laboratory control during the process. Not only does this process save time and eliminate complicated control analysis, but it also is more efficient, the last advantage being adequately reflected in the substantial increase in thyroxine content of the finished product.

This application is a continuation in part of our copending application Serial No. 113,236, filed August 30, 1949, entitled "Method of Making Synthetic Thyroprotein," now abandoned.

We claim:

1. A method for producing synthetic thyroprotein comprising forming an alkaline aqueous solution of tyrosine-containing protein having a pH between approximately 8 and 9 and an amount of protein between 50 and 75 grams per liter of solution, incorporating a manganese oxide catalyst into said solution in an amount equivalent to $\frac{1}{16}$ to $\frac{1}{4}$ pound of potassium permanganate per 300 pounds of said protein, adding iodine to said solution in an amount equivalent to 9 to 12 grams per 60 grams of protein while said solution is at a temperature of from 150 to 175° F., said iodine being added over a period of from 15 to 30 minutes, continuously agitating and sparging the solution with oxygen beginning before the introduction of said iodine, increasing the temperature of the solution to from 180 to 190° F. as soon as substantially all of the iodine has been added and continuing said agitation and sparging with oxygen at the last-named temperature until the product contains the desired thyroxine content.

2. A method for producing synthetic thyroprotein comprising forming an alkaline aqueous solution of tyrosine-containing protein having a pH between approximately 8 and 9 and an amount of protein between 50 and 75 grams per liter of solution, incorporating a manganese oxide catalyst into said solution in an amount equivalent to $\frac{1}{16}$ to $\frac{1}{4}$ pound of potassium permanganate per 300 pounds of said protein, adding iodine to said solution in an amount equivalent to 9 to 12 grams per 60 grams of protein while said solution is at a temperature of from 150 to 175° F., said iodine being added over a period of from 15 to 30 minutes, continuously agitating and sparging the solution with oxygen beginning before the introduction of said iodine, increasing the temperature of the solution to from 180 to 190° F. as soon as substantially all of the iodine has been added and continuing said agitation and sparging with oxygen at the last-named temperature for a period of from 6 to 10 hours and until the product contains the desired thyroxine content, cooling the resulting mixture to a temperature between 130 to 160° F., acidulating to the isoelectric point to precipitate the thyroprotein, and recovering the precipitated thyroprotein.

3. A method of producing synthetic thyroprotein comprising forming an alkaline aqueous solution of tyrosine-containing protein having a pH between approximately 8 and 9 and containing an amount of protein between 50 and 75 grams per liter of solution and an amount of alkali metal compound selected from the group consisting of sodium bicarbonate, sodium carbonate, potassium bicarbonate, and potassium carbonate, said amount of alkali metal compound being equal to approximately 25% by weight of the protein, incorporating a manganese oxide catalyst into said solution in an amount equivalent to $\frac{1}{16}$ to $\frac{1}{4}$ pound of potassium permanganate per 300 pounds of said protein, adding iodine to said solution in an amount equivalent to 9 to 12 grams per 60 grams of protein while said solution is at a temperature of from 150 to 175° F., said iodine being added over a period of from 15 to 30 minutes, continuously agitating and sparging the solution with oxygen beginning before the introduction of said iodine, increasing the temperature of the solution to from 180 to 190° F. as soon as substantially all of the iodine has been added and continuing said agitation and sparging with oxygen at the last-named temperature until the product contains the desired thyroxine content.

4. The method as defined in claim 3 in which the protein is casein and the catalyst is added as potassium permanganate to the alkaline aqueous solution of casein.

EDWARD S. WEST.
JOHN T. VAN BRUGGEN.

References Cited in the file of this patent

UNITED STATES PATENTS

| Number | Name | Date |
| --- | --- | --- |
| 2,478,065 | Turner et al. | Aug. 2, 1949 |

OTHER REFERENCES

Reineke et al., J. Biol. Chem., vol. 161, pp. 613–619 (1945).